460-117
M7843 OR RE EX 1,218
S. E. OVIATT.
Thrashing Machine.
No { 114. / 1,218. } Reissued Aug 13 1861.
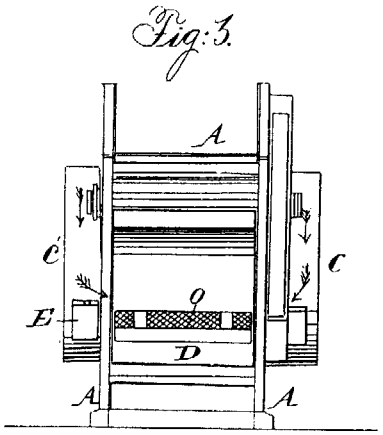
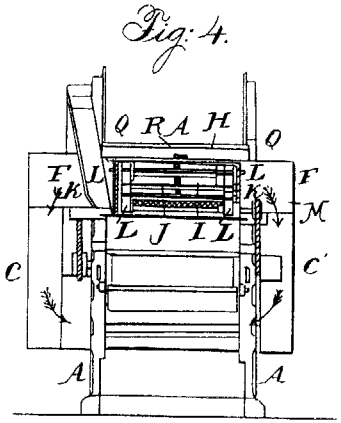
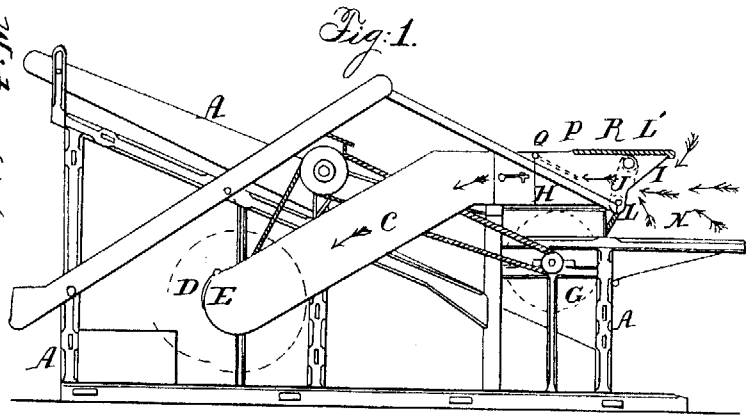
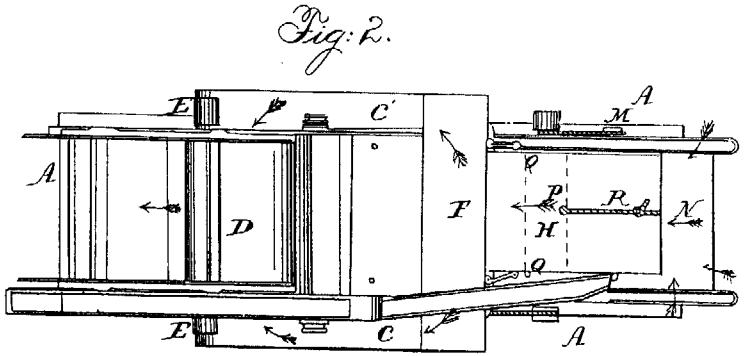
Witnesses
W H Bunnings
Henry Voll
Inventor.
S E Oviatt

UNITED STATES PATENT OFFICE.

S. E. OVIATT, OF RICHFIELD, OHIO.

IMPROVEMENT IN THRASHING-MACHINES.

Specification forming part of Letters Patent No. 29,095, dated July 10, 1860; Reissue No. 1,218, dated August 13, 1861.

*To all whom it may concern:*

Be it known that I, S. E. OVIATT, of Richfield, in the county of Summit and State of Ohio, have invented certain new and useful Improvements in Grain-Thrashing Machines; and I do hereby declare that the following is a full, clear, and exact description of the same, reference being had to the annexed drawings, making part of this specification, in which—

Figure 1 is a side elevation of a grain thrasher and separator combined, with my improvements attached; Fig. 2, a plan or top view of the same; Fig. 3, a rear end view of the same, and Fig. 4 a front end view of the same.

Similar letters of reference indicate corresponding parts in the several figures.

This invention consists in applying a suction tube or tubes to a grain-thrashing machine in such relation with the beater or thrashing cylinder that all dust evolved by the operation of thrashing will be drawn into the suction tube or tubes and expelled from the machine in such a manner that the operator cannot inhale any portion of the dust, nor be in the least exposed to the same.

The invention further consists in the employment or use of a feeding-apron or guard-screen arranged in such relation with the beater or thrashing cylinder as to greatly facilitate the manual operation of feeding the grain to the machine, and also preventing the admission of improper substances into the flue and pipes thereof.

To enable those skilled in the art to fully understand and construct my invention, I will proceed to describe it.

A indicates the general view of a thrasher and separator combined, with the usual appendages belonging to such a machine. I attach two side pipes, C C′, the lower ends of which connect with and terminate in the fan-case D, Figs. 1, 2, and 3. At the lower ends of the pipes are doors or slides E, for the convenience of oiling the fan-shaft bearings. The upper ends of the pipes C C′ connect with the transverse pipe F, Figs. 2 and 4, and this transverse pipe connects with and opens into the flue H, under which revolves the thrashing cylinder, (indicated at G, Fig. 1.) Directly over the cylinder is the floor of the flue and the top of the cylinder-case. Above the cylinder is placed the mouth I of the flue, in which revolves the screen J. This screen consists of rods, or their equivalents, extending across the mouth of the flue, and are attached to the belts K K, which pass over the pulleys L L L′ L′. The shafts of the pulleys also extend across the mouth of the flue, and have their bearings in the sides of the flue. This revolving screen is operated by a belt from the cylinder-shaft to the pulley M. The screen J is for the purpose of preventing straw and chaff from passing into the flue and pipes as it is thrown up when feeding—a result which would tend to clog up the pipes. The screen revolves in the direction to convey the straw down toward the cylinder G.

The wheat is placed upon the table N and fed into the machine, where it is thrashed, and the grain, straw, and chaff separated and discharged from the machine in the ordinary manner. During the operation a strong current of air is produced by the great velocity with which the cylinder G is required to revolve. This strong current of air causes the dust produced in thrashing to envelop the whole machine and the persons attending it, and consequently the attending of a thrashing-machine is not only disagreeable, but highly prejudical to health. As the passages from the cylinder G for straw, grain, and chaff are more or less filled up with material when the machine is at work, the current of air produced by the cylinder cannot therefore escape through these passages, but will rush out directly from the cylinder close to the persons feeding the machine, and the faster the machine is worked the more are the passages filled up and consequently more dust raised or evolved, and it requires high speed to thrash with the desired effect. The dust raised or evolved in thrashing is produced by the cylinder G and the teeth near which the attendants are constantly employed in feeding the machine; and as the dust issues from the cylinder-case it gives and is conveyed by a current of air into the mouth I of the flue, thence to the cross-pipe E, and through the side pipes, C C′, into the fan-case D, as indicated by the arrows. From the case D the dust is blown out to the end of the machine by the fan O. (Seen in Fig. 3.) This induction current of air, which passes into the mouth of the flue, is caused by the fan. Consequently all the dust which arises is carried off through the flue, so that the persons attending the machine are in no way inconvenienced by the dust, as has been found by practical tests. It is also found that when thrashing in a building the room is free from dust when compared with the old practice.

With my improvement the dust may be conveyed outside of the building by having the proper draft, so that all persons in the building are benefitted.

With slight changes in regard to the arrangement of the pipes my improvement may be applied to all kinds of machines used for this purpose.

In the flue H is placed a damper or valve, as indicated at P in Figs. 1 and 2, which works or turns upon a hinge or joint on each end in the sides of the flue, as indicated at Q. This valve will fill the whole aperture of the flue when closed. The cord R is attached to the valve for the purpose of operating it. By means of this valve the person tending the machine can easily control the quantity of draft required to clean the grain by a slight movement of the cord on a word from the measurer. The draft is easily and quickly gaged by the feeder. In the old way the draft is gaged by the measurer passing from one side of the machine to the other and moving the shutters at the ends of the fan case.

Thus with my improvement the evil and inconvenience arising from the dust in thrashing are removed, and the dust is discharged from the machine with the chaff, &c. Also the regulation of the draft or wind for cleaning the grain is more readily and effectually accomplished than by the ordinary means. The feeding-apron or screen J is also an important feature of the invention, greatly assisting the proper feeding of the grain to the beater or cylinder G, and also preventing all chaff, straw, &c., passing into the flue and pipes.

Having thus described my invention, what I claim as new and desire to secure by Letters Patent, is—

1. The employment or use of suction tubes or pipes in combination with the beater or thrashing cylinder of a grain-thrashing machine for the purpose of receiving or "sucking in" the dust evolved during the operation of thrashing, and discharging the same at any convenient point, free from the operators or attendants, when arranged and operating substantially as set forth.

2. The endless feeding-apron and screen J, arranged in relation with the thrashing-cylinder G to operate as and for the purpose specified.

S. E. OVIATT.

Witnesses:
M. M. LIVINGSTON,
J. F. BUCKLES.